(12) United States Patent
Baghel et al.

(10) Patent No.: US 11,716,648 B2
(45) Date of Patent: Aug. 1, 2023

(54) CONGESTION CONTROL FOR NR V2X

(71) Applicant: QUALCOMM Incorporated, San Diego, CA (US)

(72) Inventors: Sudhir Kumar Baghel, Hillsborough, NJ (US); Kapil Gulati, Hillsborough, NJ (US); Tien Viet Nguyen, Bridgewater, NJ (US); Gabi Sarkis, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/061,543

(22) Filed: Oct. 1, 2020

(65) Prior Publication Data

US 2021/0105661 A1 Apr. 8, 2021

Related U.S. Application Data

(60) Provisional application No. 62/911,106, filed on Oct. 4, 2019.

(51) Int. Cl.
*H04W 28/02* (2009.01)
*H04W 24/08* (2009.01)
*H04W 4/40* (2018.01)

(52) U.S. Cl.
CPC ......... *H04W 28/0289* (2013.01); *H04W 4/40* (2018.02); *H04W 24/08* (2013.01)

(58) Field of Classification Search
CPC ....... H04W 4/40; H04W 72/02; H04W 92/18; H04W 4/46; H04W 24/10; H04W 28/0289
See application file for complete search history.

(56) References Cited

U.S. PATENT DOCUMENTS

2018/0234973 A1* 8/2018 Lee .................. H04W 88/04
2020/0145867 A1* 5/2020 Tseng .................. H04W 76/14
(Continued)

FOREIGN PATENT DOCUMENTS

EP 3554172 A1 10/2019
EP 3672133 A1 6/2020
(Continued)

OTHER PUBLICATIONS

International Search Report and Written Opinion—PCT/US2020/053983—ISA/EPO—dated Dec. 23, 2020.

*Primary Examiner* — Khaled M Kassim
*Assistant Examiner* — Najeeb Ansari

(57) ABSTRACT

In one aspect, a method includes determining, by a user equipment (UE), a channel busy ratio (CBR) window for a CBR measurement for one or more resources; determining, by the UE, a CBR measurement value for the CBR window and for the one or more resources; determining, by the UE, a channel occupancy ratio (CR) window based on a first number of subframes used for a history of past transmissions and based on a second number of subframes used for future planned transmissions and corresponding retransmissions; and determining, by the UE, a CR value for the CR window based on subchannels used for the one or more resources for the first number of subframes and based on subchannels estimated for the one or more resources for the second number of subframes. In another aspect, a method includes determining a CR window based on a CBR measurement value.

30 Claims, 7 Drawing Sheets

(56) References Cited

U.S. PATENT DOCUMENTS

2021/0211906 A1* 7/2021 Chae .................. H04W 24/10
2021/0314796 A1* 10/2021 Hoang ................ H04W 24/08
2021/0329596 A1* 10/2021 Freda ................ H04W 72/082

FOREIGN PATENT DOCUMENTS

WO     WO-2018131947 A1    7/2018
WO     WO-2020033088 A1    2/2020

* cited by examiner

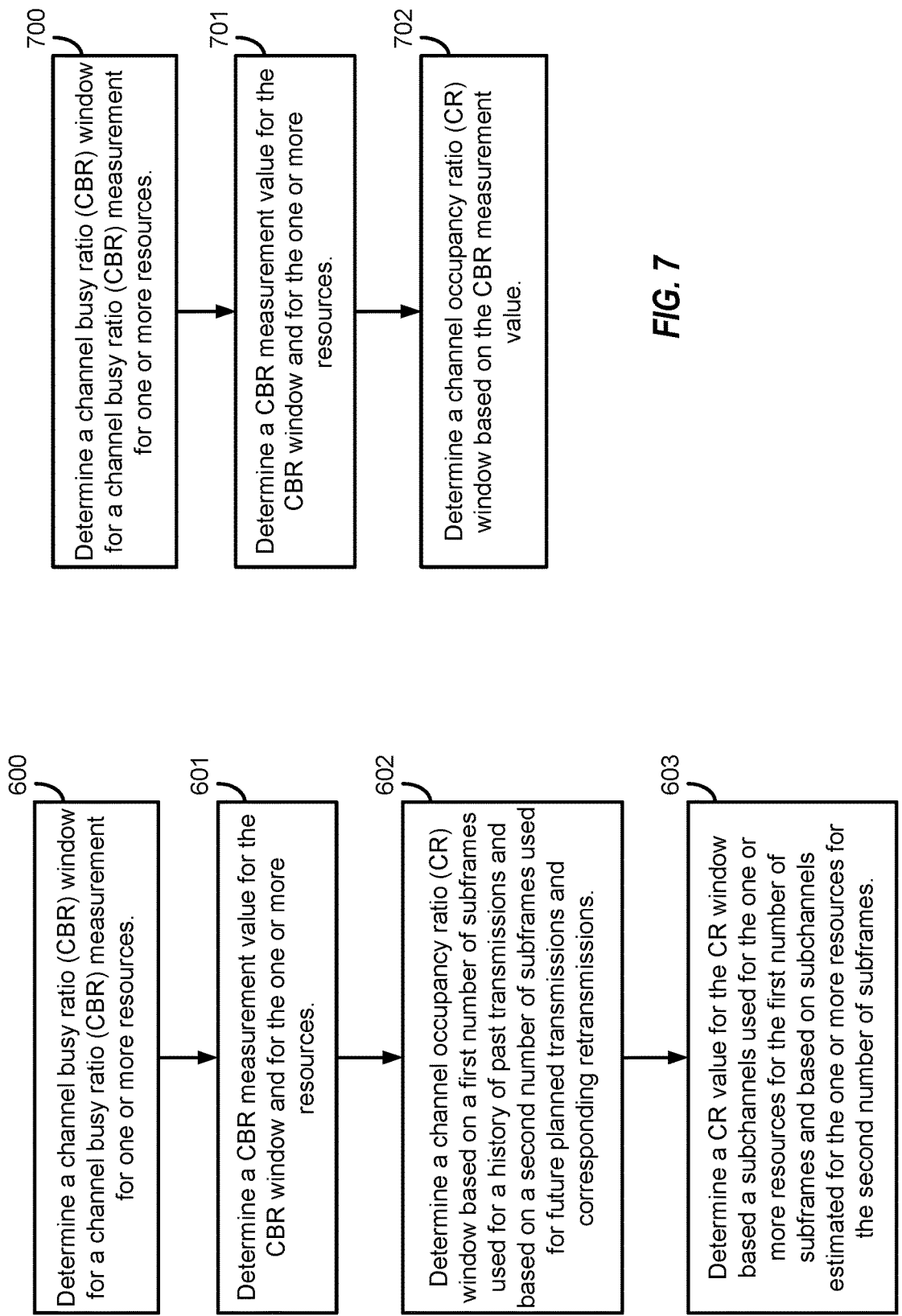

CONGESTION CONTROL FOR NR V2X

CROSS-REFERENCE TO RELATED APPLICATIONS

This application claims the benefit of U.S. Provisional Patent Application No. 62/911,106, entitled, "CONGESTION CONTROL FOR NR V2X," filed on Oct. 4, 2019, which is expressly incorporated by reference herein in its entirety.

BACKGROUND

Field

Aspects of the present disclosure relate generally to wireless communication systems, and more particularly, to managing device-to-device communications, such as congestion control for vehicle-to-everything (V2X) in new radio (NR).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the LIE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies, including multi-access technologies, not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques relate to improved methods, systems, devices, and apparatuses that support enhanced congestion control procedures for device to device communications, such as vehicle to everything (V2X) communications. Such congestion control may enable enhanced operation in next generation wireless modes, such as improved aperiodic communication performance in fifth generations wireless new radio. Accordingly, such techniques may increase reliability and throughput, reduce latency, and enable operation in URLLC modes.

In one aspect of the disclosure, a method of wireless communication includes determining, by a user equipment (UE), a channel busy ratio (CBR) window for a channel busy ratio (CBR) measurement for one or more resources; determining, by the UE, a CBR measurement value for the CBR window and for the one or more resources; determining, by the UE, a channel occupancy ratio (CR) window based on a first number of subframes used for a history of past transmissions and based on a second number of subframes used for future planned transmissions and corresponding retransmissions; and determining, by the UE, a CR value for the CR window based on subchannels used for the one or more resources for the first number of subframes and based on subchannels estimated for the one or more resources for the second number of subframes.

In an additional aspect of the disclosure, an apparatus configured for wireless communication is disclosed. The apparatus includes means for determining, by a user equipment (UE), a channel busy ratio (CBR) window for a channel busy ratio (CBR) measurement for one or more resources; means for determining, by the UE, a CBR measurement value for the CBR window and for the one or more resources; means for determining, by the UE, a channel occupancy ratio (CR) window based on a first number of subframes used for a history of past transmissions and based on a second number of subframes used for future planned transmissions and corresponding retransmissions; and means for determining, by the UE, a CR value for the CR window based on subchannels used for the one or more resources for the first number of subframes and based on subchannels estimated for the one or more resources for the second number of subframes.

In an additional aspect of the disclosure, a non-transitory computer-readable medium having program code recorded thereon. The program code includes code to determine, by a user equipment (UE), a channel busy ratio (CBR) window for a channel busy ratio (CBR) measurement for one or more resources; determine, by the UE, a CBR measurement value for the CBR window and for the one or more resources; determine, by the UE, a channel occupancy ratio (CR)

window based on a first number of subframes used for a history of past transmissions and based on a second number of subframes used for future planned transmissions and corresponding retransmissions; and determine, by the UE, a CR value for the CR window based on subchannels used for the one or more resources for the first number of subframes and based on subchannels estimated for the one or more resources for the second number of subframes.

In an additional aspect of the disclosure, an apparatus configured for wireless communication is disclosed. The apparatus includes at least one processor, and a memory coupled to the processor. The processor is configured to determine, by a user equipment (UE), a channel busy ratio (CBR) window for a channel busy ratio (CBR) measurement for one or more resources; determine, by the UE, a CBR measurement value for the CBR window and for the one or more resources; determine, by the UE, a channel occupancy ratio (CR) window based on a first number of subframes used for a history of past transmissions and based on a second number of subframes used for future planned transmissions and corresponding retransmissions; and determine, by the UE, a CR value for the CR window based on subchannels used for the one or more resources for the first number of subframes and based on subchannels estimated for the one or more resources for the second number of subframes.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a block diagram illustrating example blocks executed by a UE configured according to an aspect of the present disclosure.

FIG. 7 is a block diagram illustrating example blocks executed by a UE configured according to another aspect of the present disclosure.

DETAILED DESCRIPTION

Figure 1:
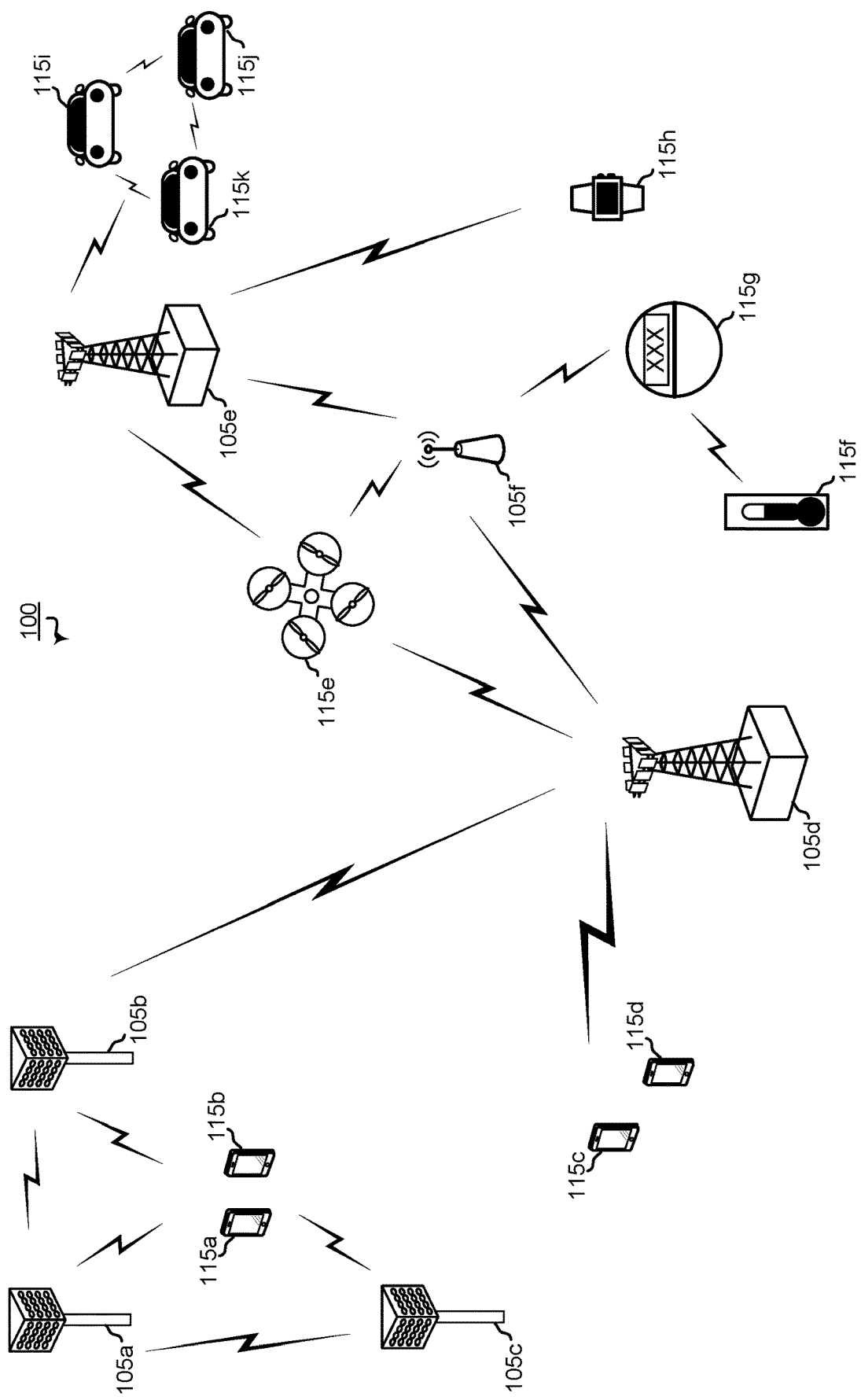
FIG. 1 is a block diagram illustrating details of a wireless communication system.

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The detailed description is related to congestion control enhancements for device-to-device (D2D) communications. Conventionally, congestion control for D2D communications is based on both a usage history and an estimated usage for future transmission. However, estimating future usage may not be reliable in all scenarios. For example, when aperiodic communications are being used, a device may not be able to accurately estimate its future usage or the usage of other devices and/or the medium. Accordingly, the UE may not be able to accurately determine congestion information and/or may not be able to as effectively perform congestion control. Such procedures may not achieve high reliability and/or achieve low latency requirements or constraints for some operating modes, such as URLLC, (e.g., eURLLC).

The described techniques relate to improved methods, systems, devices, and apparatuses that support congestion control enhancements for D2D communications, including for aperiodic communications. For example, channel busy ratio and channel occupancy ratio calculation may be based on a more limited estimation of possible future transmissions. To illustrate, a future window for congestion control estimation may be limited to currently scheduled aperiodic transmissions in some implementation. Such enhanced congestion control enhancements may enable enhanced operation in D2D communications modes, such as for V2X NR. Accordingly, such techniques may increase reliability and throughput, reduce latency, and enable operation in URLLC modes.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
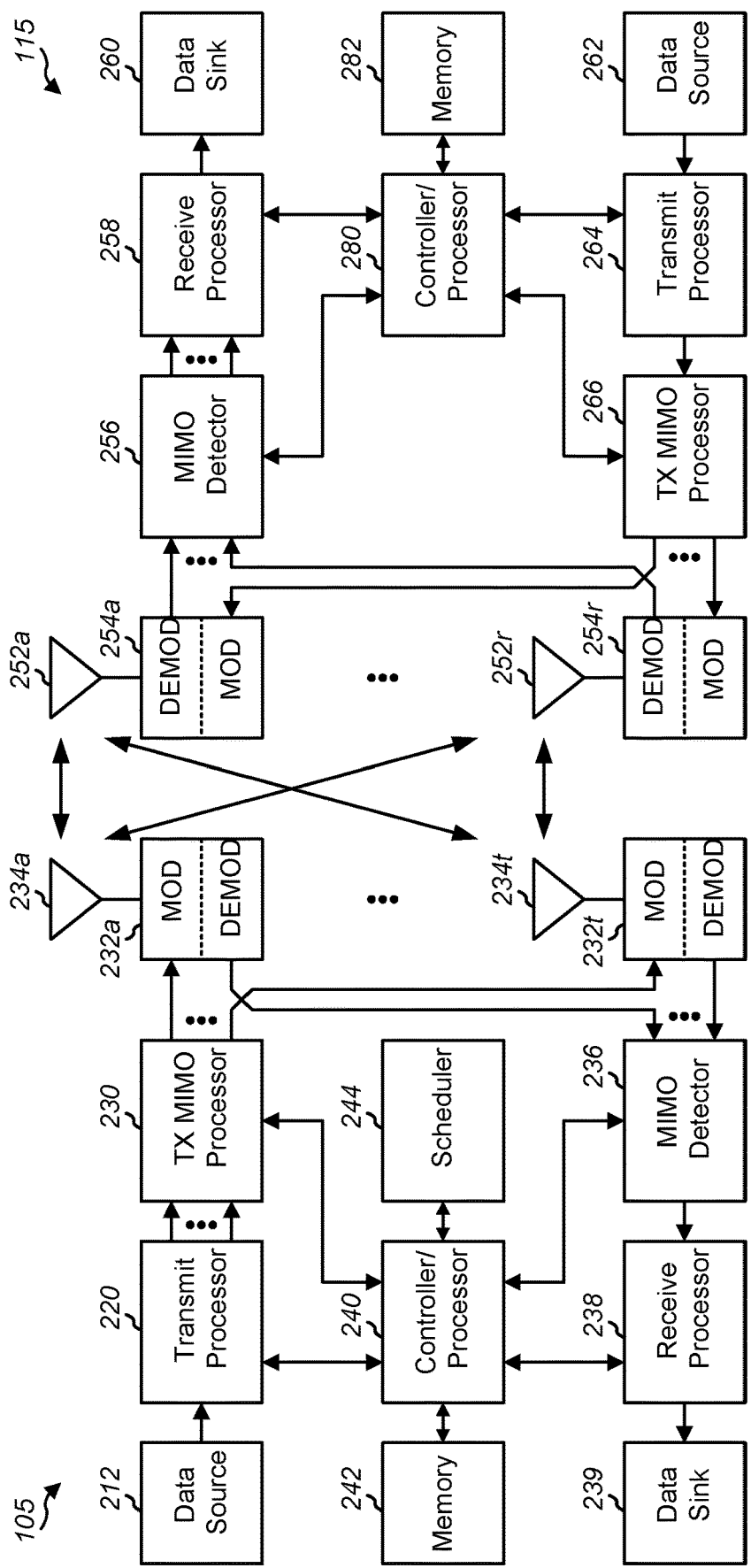
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6 and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities.

In some examples, an individual base station 105 or LTE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
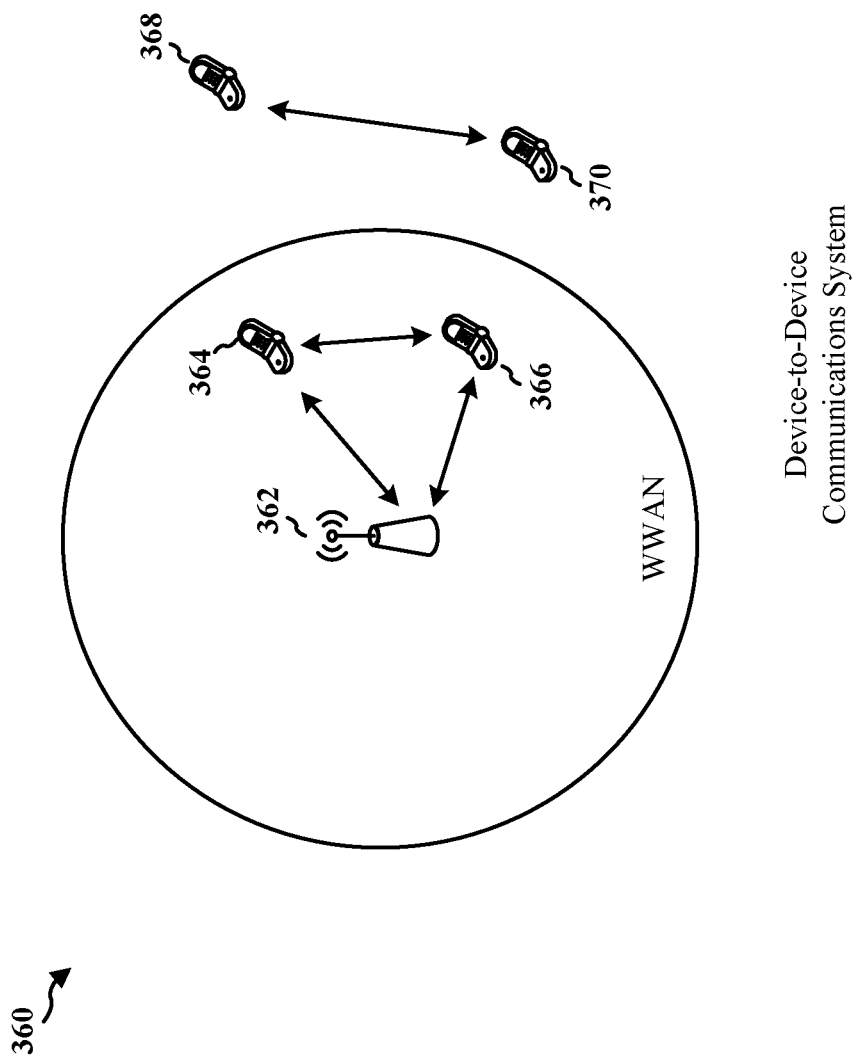
FIG. 3 is a diagram of a device-to-device communications system.

FIG. 3 is a diagram of a device-to-device (D2D) communications system 360. The D2D communications system 360 includes a plurality of UEs 364, 366, 368, 370. The D2D communications system 360 may overlap with a cellular communications system, such as for example, a WWAN. Some of the UEs 364, 366, 368, 370 may communicate together in D2D communication using the DL/UL WWAN spectrum, some may communicate with the base station 362, and some may do both. For example, as shown in FIG. 3, the UEs 368, 370 are in D2D communication and the UEs 364, 366 are in D2D communication. The UEs 364, 366 are also communicating with the base station 362. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on NR, LTE, FlashLinQ, WiMedia, Bluetooth, ZigBee, or Wi-Fi based on the IEEE 802.11 standard. To simplify the discussion, the exemplary methods and apparatus are discussed within the context of NR. However, one of ordinary skill in the art would understand that the exemplary methods and apparatuses are applicable more generally to a variety of other wireless device-to-device communication systems.

D2D communication may be used to provide direct communication between devices. D2D communication enables one device to communicate with another device and transmit data to the other device over allocated resources. One use for the D2D communication is a vehicle-to-vehicle (V2V) communication and vehicle-to-everything (V2X) communication. Thus, according to the V2V communication, a first vehicle's device may perform D2D communication with another vehicle's device. According to the V2X communication, a vehicle's device may perform D2D communication with another device, regardless of whether that the device resides in a vehicle or not.

One type of communication that may be used for V2V communication is dedicated short range communication (DSRC). The DSRC is a short-range wireless communication capability, typically based on IEEE 802.11p that is similar to Wi-FI. In the DSRC, before transmission, a device may examine a channel. For transportation-related communications (e.g., V2X communication), 5.9 GHz unlicensed spectrum is generally reserved to communicate intelligent transportation services (ITS). Recently, implementing other types of communication such as NR communication for V2V communication have been under development. For example, NR D2D may be utilized for V2V communication, over a licensed spectrum and/or an unlicensed spectrum.

In a vehicle-to-everything (V2X) wireless communication system, UEs may communicate directly using device-to-device communication, also known as sidelink communication, without using a network entity (e.g., base station) as an intermediary. In some cases, a UE may operate using a particular transmission mode, such as transmission mode 4, where resource selection and/or scheduling is performed by the UE rather than a network entity (e.g., base station). In some aspects, the UE may perform resource selection and/or scheduling by measuring one or more sidelink channels, by decoding sidelink control information (SCI) that indicates channel availability, by determining a channel busy rate (CBR) associated with various sidelink channels, and/or the like.

In transmission mode 4, a UE may generate sidelink grants, and may transmit the sidelink grants in SCI. A sidelink grant may indicate, for example, one or more parameters (e.g., transmission parameters) to be used for an upcoming V2X transmission (e.g., a V2X data transmission), such as one or more resource blocks to be used for the upcoming V2X transmission, one or more subframes to be used for the upcoming V2X transmission, a modulation and coding scheme (MCS) to be used for the upcoming V2X transmission, and/or the like.

In V2X communication systems, conditions of the sidelink channel used to carry V2X communications can vary widely and change quickly due to the high mobility of vehicles and UEs associated with the vehicles, large variations in vehicle traffic at different times of day and in different locations, a wide variety of topographies that the vehicles may traverse (e.g., dense urban environments, hilly environments, flat environments, etc.), and/or the like. Furthermore, V2X communication systems need to be highly reliable due to mission critical safety issues associated with, for example, autonomous vehicles. Some techniques and apparatuses described herein improve performance of V2X communication systems by dynamically determining parameters for V2X transmissions based at least in part on dynamic factors associated with one or more vehicles, the sidelink channel, and/or the like.

In some aspects, V2X transmissions may be one-to-many broadcast and/or multicast transmissions. In some aspects, V2X transmissions may not require any physical layer feedback from receiving devices, such as acknowledgement (ACK) or negative acknowledgement (NACK) feedback. In some aspects, V2X transmissions may be configured without retransmission. In some aspects, V2X transmissions may be configured with a number of retransmissions (e.g., five retransmissions). In a particular aspect, the retransmission occur automatically, such as without ACK/NACK feedback.

A first UE may communicate with a second UE (and one or more other UEs) using device-to-device (D2D) communications via one or more sidelink channels. In some aspects, the UEs may correspond to one or more other UEs described elsewhere herein. The UEs may transmit V2X communications using the sidelink channel.

The sidelink channel may include a PSCCH and a PSSCH. The sidelink channel may optionally include a physical sidelink feedback channel (PSFCH). The PSCCH may be used to communicate control information, similar to a physical downlink control channel (PDCCH) and/or a physical uplink control channel (PUCCH) used for communications with a base station. The PSSCH may be used to communicate data, similar to a physical downlink shared channel (PDSCH) and/or a physical uplink shared channel (PUSCH) used for communications with a base station. For example, the PSCCH may carry sidelink control information (SCI), which may indicate various control information used for sidelink communications, such as one or more resources (e.g., time and/or frequency resources) where a transport block (TB) that includes data is carried on the PSSCH. The TB may include V2X data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like.

In some aspects, the sidelink channel may use resource pools. For example, a scheduling assignment (e.g., included in SCI) may be transmitted in sub-channels using specific resource blocks (RBs) across time. In some aspects, data transmissions (e.g., on the PSSCH) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE may operate using transmission mode 4, where resource selection and/or scheduling is performed by the UE (e.g., rather than a base station). In some aspects, the UE may perform resource selection and/or scheduling by sensing channel availability for transmissions. For example, the UE may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of V2X communications based at least in part on the measurement(s).

Additionally, or alternatively, the UE may perform resource selection and/or scheduling using SCI received in the PSCCH, which may indicate occupied resources, channel parameters, and/or the like. Additionally, or alternatively, the UE may perform resource selection and/or scheduling by determining a channel busy rate (CBR) associated with various sidelink channels, which may be used for rate control (e.g., by indicating a maximum number of resource blocks that the UE can use for a particular set of subframes).

In transmission mode 4, a UE may generate sidelink grants, and may transmit the grants in SCI. A sidelink grant may indicate, for example, one or more parameters (e.g., transmission parameters) to be used for an upcoming V2X transmission, such as one or more resource blocks to be used for the upcoming V2X transmission on the PSSCH (e.g., for TBs), one or more subframes to be used for the upcoming V2X transmission, a modulation and coding scheme (MCS) to be used for the upcoming V2X transmission, and/or the like. In some aspects, a UE may generate a sidelink grant that indicates one or more parameters for semi-persistent scheduling (SPS), such as a periodicity of a V2X transmission (e.g., a periodic V2X message, such as a safety message and/or the like). Additionally, or alternatively, the UE may generate a sidelink grant for event-driven scheduling, such as for an on-demand V2X message.

In V2X communication systems, conditions of the sidelink channel used to carry V2X communications can vary widely and change quickly due to the high mobility of vehicles and UEs associated with the vehicles, large variations in vehicle traffic at different times of day and in different locations, a wide variety of topographies that the vehicles may traverse (e.g., dense urban environments, hilly environments, flat environments, etc.), and/or the like. Furthermore, V2X communication systems need to be highly reliable due to mission critical safety issues associated with, for example, autonomous vehicles. Some techniques and apparatuses described herein improve performance of V2X communication systems by dynamically determining parameters for V2X transmissions based at least in part on dynamic factors associated with one or more vehicles, the sidelink channel, and/or the like.

In some implementations, a UE may be able to perform autonomous resource selection for V2X transmissions, in accordance with various aspects of the present disclosure.

For example, a UE may determine a limit on a number of resource blocks (RBs) permitted to be used for a V2X transmission by the UE. In some aspects, the UE may determine the limit based at least in part on a congestion level of one or more sidelink channels, which may be determined based at least in part on measuring one or more sidelink channels (e.g., for S-RSSI, PSSCH-RSRP, and/or the like), receiving SCI associated with the one or more sidelink channels, and/or the like. For example, the UE may determine a channel busy rate (CBR) for a sidelink channel in association with a time n at which resource selection is triggered for the UE (e.g., CBR(n−100, n−1), where n−100 denotes a start of a time period and n−1 denotes the end of the time period), and may determine a maximum number of RBs allowed for use by the UE at time n based at least in part on the CBR. Additionally, or alternatively, the UE may determine the limit on the number of RBs by determining a maximum number of RBs allowed for use by the UE in association with time n (e.g., CRlimit(n)) and subtracting a number of RBs already used or scheduled by the UE in association with time n (e.g., CR(n−a, n+b), where n−a denotes a start of the time period and n+b denotes an end of the time period).

The UE may determine one or more parameters for the V2X transmission based at least in part on the limit on the number of RBs. In some aspects, the one or more parameters may be referred to as one or more transmission parameters and/or one or more V2X transmission parameters. As shown, the one or more parameters may include a modulation and coding scheme (MCS) for the V2X transmission, a number of transport blocks (TBs) for the V2X transmission, a number of RBs per TB for the V2X transmission, a retransmission configuration for the V2X transmission, and/or the like. In some aspects, the UE may determine the one or more parameters such that the number of RBs for the V2X transmission does not exceed the limit on the number of RBs.

As an example, if the UE selects an MCS with a lower index value (e.g., permitting fewer bits per symbol) for a V2X transmission, then that V2X transmission would require more TBs and corresponding RBs than if the same V2X transmission were to use an MCS with a higher index value (e.g., permitting more bits per symbol). However, using an MCS with a lower index value for the V2X transmission may increase the range of the V2X transmission and/or may increase reliability of the V2X transmission as compared to using an MCS with a higher index value. Thus, in some aspects, if the limit on the number of RBs is relatively high (e.g., greater than or equal to a threshold), then the UE may select an MCS with a lower index value, and if the limit on the number of RBs is relatively low (e.g., less than or equal to a threshold), then the UE may select an MCS with a higher index value. In some aspects, the UE may select from multiple different MCS index values, and different MCS index values may be associated with different thresholds for the limit on the number of RBs.

As another example, if the UE configures a retransmission configuration to enable retransmissions for a V2X transmission, then that V2X transmission would require more TBs and corresponding RBs than if the UE were to configure the retransmission configuration to disable retransmissions for the same V2X transmission. However, enabling retransmissions for the V2X transmission may increase the range of the V2X transmission and/or may increase reliability of the V2X transmission as compared to disabling retransmissions for the V2X transmission. Thus, in some aspects, if the limit on the number of RBs is relatively high (e.g., greater than or equal to a threshold), then the UE may enable retransmissions, and if the limit on the number of RBs is relatively low (e.g., less than or equal to a threshold), then the UE may disable retransmissions. In some aspects, the UE may select from multiple different quantities of retransmissions (e.g., one retransmission, two retransmissions, etc.), and different quantities of retransmissions may be associated with different thresholds for the limit on the number of RBs.

In some aspects, the UE may select the one or more parameters to increase or maximize a range for the V2X transmission (e.g., a distance that can be covered by the V2X transmission and corresponding retransmissions) subject to the limit on the number of RBs, as described in more detail below in connection with FIG. 5. In this way, the UE may improve reliability, may increase safety, may increase the likelihood of successful reception of the V2X transmission, etc., while operating according to the limit on the number of RBs permitted for the V2X transmission.

In a V2X communication system, sidelink channel conditions can vary widely at different times, at different geographic locations, on different frequencies, and/or the like. Thus, the UE may dynamically determine the one or more parameters for the V2X transmission based at least in part on conditions that exist at the time that the V2X transmission is scheduled. In some aspects, the UE may determine the one or more transmission parameters based at least in part on a dynamic factor associated with the UE and/or a vehicle associated with the UE (e.g., a network traffic demand associated with one or more applications of the UE, congestion, and/or the like). Additionally, or alternatively, the UE may determine the one or more transmission parameters based at least in part on a dynamic factor associated with a wireless network via which the V2X transmission is to be transmitted (e.g., a congestion level associated with the wireless network, a carrier frequency on which the V2X transmission is to be transmitted, a priority of the V2X transmission on the wireless network, and/or the like). In this way, the UE may improve or optimize transmission of V2X messages under changing conditions.

Additionally, or alternatively, the UE may determine the one or more V2X transmission parameters based at least in part on the selected frequency or frequencies. For example, different frequencies may be associated with different CBR values, and thus may be associated with different limits on the number of RBs permitted for use by the UE. Additionally, or alternatively, different combinations of transmission parameters may result in different performance at different frequencies, and the UE may use this as a factor when determining the one or more transmission parameters.

In some aspects, the UE may determine the one or more transmission parameters based at least in part on a network traffic demand associated with one or more applications of the UE. For example, if the first UE has a relatively high network traffic demand (e.g., the number of requested V2X transmissions is greater than or equal to a threshold), then the UE may use a smaller number of RBs per V2X transmission. Conversely, if the UE has a relatively low network traffic demand (e.g., the number of requested V2X transmissions is less than or equal to a threshold), then the UE may use a larger number of RBs per V2X transmission. The UE may configure a smaller number of RBs per V2X transmission by using a higher MCS index, by disabling retransmissions or configuring a smaller number of retransmissions, by using a smaller number of TBs, and/or by using a smaller number of RBs per TB. Conversely, the UE may configure a larger number of RBs per V2X transmission by using a lower MCS index, by enabling retransmissions or configuring a larger number of retransmissions, by using a larger number of TBs, and/or by using a larger number of RBs per TB.

Additionally, or alternatively, the UE may determine the one or more transmission parameters based at least in part on a congestion level associated with a wireless network via which the V2X transmission is to be transmitted (e.g., a congestion level of the sidelink channel and/or one or more frequencies via which the V2X transmission is to be transmitted). For example, if the wireless network has a relatively high congestion level, then the UE may use a smaller number of RBs per V2X transmission. Conversely, if the wireless network has a relatively low congestion level, then the UE may use a larger number of RBs per V2X transmission. In some aspects, the UE may determine the congestion level based at least in part on a CBR, a resource restriction (e.g., a rate control parameter, a power control parameter, a congestion control parameter, etc.), a measured parameter of the wireless network (e.g., an energy level), and/or the like.

The UE may transmit the V2X transmission (e.g., to a second UE and/or one or more other UEs) based at least in part on the one or more parameters. For example, the UE may modulate and/or encode the V2X transmission using a selected MCS, may transmit the V2X transmission using a selected number of TBs, may transmit the V2X transmission using a selected number of RBs per TB, may retransmit or prevent retransmission of the V2X transmission according to a selected retransmission configuration, may transmit the V2X transmission on a selected carrier frequency, and/or the like. By accounting for dynamic factors when determining the above transmission parameter(s), the UE may improve performance (e.g., a transmission range) of the V2X transmission subject to constraints on the V2X transmission. For example, in some cases, the UE may transmit a V2X transmission using an MCS with a high index, rather than dropping the V2X transmission.

Figure 4:
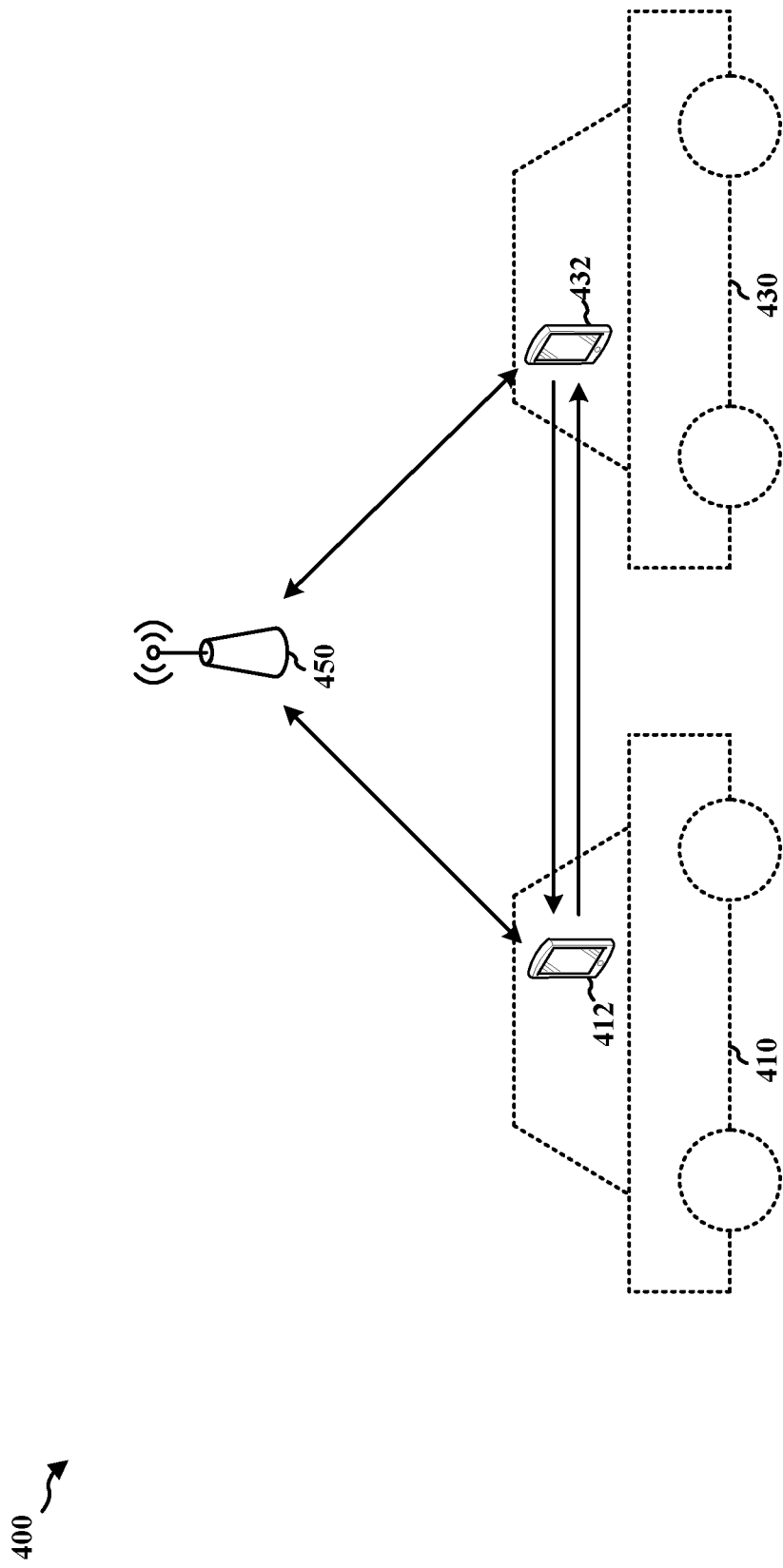
FIG. 4 is an example diagram illustrating device-to-device communication.

FIG. 4 is an example diagram 400 illustrating device-to-device communication. A first device 412 (e.g., a UE) is present in a first vehicle 410, and thus may travel with the first vehicle 410. A second device 432 (e.g., another UE) may be present in a second vehicle 430. In another aspect, the first device 412 may be present independently from the first vehicle 410 or may be a part of the first vehicle 410. The second device 432 may be present independently from the second vehicle 430, or may be a part of the second vehicle 430. The first device 412 and the second device 432 may be connected (e.g., in connected mode with the base station) to a base station 450. The first device 412 and the second device 432 may also be configured to perform D2D communication with each other over NR. The first device 412 and the second device 432 may also perform short range communication with each other over IEEE 802.11p.

The vehicles may include an autonomous vehicle, a semi-autonomous vehicle, a non-autonomous vehicle, and/or the like. Although both UEs in FIG. 4 are shown as being associated with a vehicle, in some aspects, one or more of the UEs may not be associated with a vehicle. For example, a UE may be associated with infrastructure (e.g., traffic infrastructure), such as a traffic signal, a lane signal, a sensor, a traffic controller system, and/or the like.

NR V2V communication may provide more reliable performance than LTE V2V by providing for a more history based calculation of congestion and/or a more limited reliance on future periodic transmissions. Although the following discussion refers to NR V2V communication by way of illustration and not limitation, the NR V2V communication is similar to NR D2D communication, and thus following discussion may also apply to NR and LTE D2D communication.

Congestion may occur in NR V2V communication, e.g., due to increased network traffic. Congestion control may be implemented to control network congestion via certain parameters related to communication over NR V2V based on a level of the congestion. For example, in certain instances, there may be no centralized entity to perform congestion control of the spectrum. The congestion control may be performed without a centralized entity (e.g. eNB) to manage admission control and/or radio resource utilization (e.g. out-of-network coverage operation, and/or with decentralized resource selection/reselection procedures). Without a centralized entity managing network resources and device communications, collisions of different communications may occur. Too many collisions may adversely affect the performance of the communication system. For example, collisions may occur when resources are not properly allocated to different device communications which may result in some devices not having sufficient resources for communication. Depending on the communication system and/or the channel access method of the communication system, a device may not be able to handle network congestion. For example, a number of communications that can be successfully performed reliably in a network may vary depending on a type of a communication system. Decentralized congestion control may be based on an 802.11p physical layer and may be generalized to provide coexistence of various technologies. Therefore, technology-neutral decentralized congestion control in a system with no centralized entity for managing congestion may be desirable. In some aspects, technology specific enhancements for decentralized congestion control may be provided.

In an aspect, congestion control may be based on a channel busy ratio (CBR) and/or a channel utilization. The CBR may represent a percentage of busy resources. The channel utilization may represent a percentage of a channel being utilized for communication. The CBR and the channel utilization may be technology-neutral, as described below. Decentralized congestion control for the 802.11p technology may be derived based on the technology-neutral congestion control while the technology-neutral approach for decentralized congestion control may be used for NR V2V.

Each UE may estimate a channel utilization based on a CBR. The CBR may be an estimate of the percentage of the resources that are deemed busy/utilized. In an aspect, a resource may be deemed busy and/or utilized if a signal is decoded on such a resource or if the energy in such a resource is greater than an energy threshold.

The CBR may be estimated by dividing a number of probes that found busy resources by a number of total probes on the resources, according to the following equation:

$$CBR_{est} = \frac{\sum 1 \vee \text{probe with resource busy}}{Np}$$

where:
1∨ probe with resource busy is the indicator function for a probe that found the resource busy.
Np is the total number of probes that probed resources for resource-busy measurements.
Nt is the time granularity of resource utilization (e.g. a 1 ms TTI for NR, an OFDM symbol duration for 802.11p)
Nf is the frequency granularity of resource utilization (e.g. channel BW for 802.11p, 180 kHz for NR). Nt and Nf may define granularity of resources when the resources are allocated by time and frequency.

For example, if the UE probes every 10 microseconds, probing for 100 msec would yield a total number of probes equal to 10000. If there are a total of 10000 probes used to probe for busy resources, and 8000 probes found that the resources probed are busy, then the CBR of the system may be 80%.

CBR may be a function of the number of stations $N_{Sta}$ (e.g., a number of UEs, a number of transmitters) within certain proximity:

$CBR=f(N_{sta})$, where the function $f(N_{sta})$ may be technology dependent and may depend on a channel access procedure of a corresponding technology.

In an aspect, congestion control may be performed by limiting the channel utilization per UE if the estimated CBR exceeds a CBR limit ($CBR_{limit}$). The channel utilization per UE may be expressed as a channel resource (CR). A CR limit (e.g., per UE or STA) may be determined by dividing a total resources that the system can utilize (e.g., $CBR_{limit}$) by a number of stations (e.g., UEs) $N_{Sta}$, which can be expressed as:

$$CR_{limit} = \frac{CBR_{limit}}{N_{Sta}} = \frac{CBR_{limit}}{f^{-1}(CBR)}$$

In an alternate formulation, since the congestion control may be activated when the estimated CBR exceeds a CBR limit ($CBR_{limit}$), the CR limit (e.g., per UE or STA) may be determined as:

$$CR_{limit} = \frac{CBR}{N_{Sta}} = \frac{CBR}{f^{-1}(CBR)}$$

In one approach, CBR may be estimated using a linear function of $N_{Sta}$, which may be expressed as $CBR=a*N_{sta}+b$. For technology coexistence with 802.11p, the parameters may be 1/a=4000 and b=0.62 (target CBR limit). Additionally, the CR for 802.11p may be estimated as $T_{on}/(T_{on}+T_{off})$ due to TDMA access (when a device transmits on the entire channel bandwidth and there is no FDMA operation), where $T_{on}$ is a duration of time when the UE is on and $T_{off}$ is a duration of time when the UE is off. $CR_{limit}$ may be estimated as $T_{on}/(T_{on}+T_{off\_limit})$, where $T_{off\_limit}$ the minimum time that the UE may be off to maintain the channel utilization to be less than the CR limit.

Using the above approach for 802.11p, the following equations may be achieved.

$$\frac{1}{CR_{limit}} = 1 + \frac{T_{off\_limit}}{T_{on}} = \frac{\frac{CBR-b}{a}}{CBR} \Longrightarrow T_{off\_limit} = T_{on} \times \left(\frac{1}{a}\frac{CBR-b}{CBR} - 1\right)$$

Thus, a CR for 802.11p may be $T_{on}$ divided by the total time: $CR=T_{on}/(T_{on}+T_{off})$. For example, if the UE is on 400 msec and off for 100 msec, then the CR is 400/(400+100)=4/5. In an aspect, if the UE is on longer, the UE should be off longer. Further, as shown above, $T_{off}$ or $T_{off\_limit}$ may be a linear function of $T_{on}$, which depends on the CBR. Thus, if the channel is busy and thus the CBR is high, the UE may backoff more on transmissions due to a greater Torr or a greater $T_{off\_limit}$.

The above congestion control approach may have the following limitations when used in a system with multiple technologies sharing the network resources. Firstly, the CBR and channel utilization (e.g., a CR) definitions may be applicable only to TDMA systems, where $CR=T_{on}/(T_{on}+T_{off})$. Secondly, a UE estimating the CBR of the system may treat all radio resources equally, which may cause a problem for NR V2V. In particular, for NR V2V, the total radio resources may be split into control resources and data resources. When separate resources are used for control and data, control resources may become congested while the overall resources are not congested (e.g., due to the data resources being free and not congested). In such an example, treating all resources equally when there are different types of resources may not effectively address the congestion of resources in the system. Thus, an approach to consider a CBR for control resources and a CBR for data resources separately is desired. For example, by considering a CBR for control resources and a CBR for data resources separately, if the control resources are too congested, the system may fail even if the data resources are available. Similarly, a CBR for control resources and a CBR for data resources separately, if the data resources are too congested, the system may fail even if the control resources are available.

Thirdly, as discussed above, the UE may determine that a resource is busy if a signal is decoded on the resource and/or the energy measured on the resource is greater than a threshold. However, such a determination of a busy resource by the UE may not consider coexistence of multiple technologies on the same channel. Thus, an approach to congestion control for coexistence of multiple technologies in addressing the network congestion is desired. For example, according to an aspect of the disclosure, to enable coexistence, each of the technologies may not be allowed to utilize more than 40% of the total resources if a total channel utilization is 80/a.

Fourthly, use of a single threshold for the CBR independent of a priority of transmissions may not allow the UE to place more importance in transmission of higher priority packets than in transmission of lower priority packets. Thus, it may be beneficial for the system to have different congestion limits for packets with different priorities. In an aspect, it may be desirable to control packet transmission based on the priorities of the packets. For example, according to an aspect of the disclosure, if channel utilization is over a certain threshold (e.g., 50%), the UE may not transmit low priority packets, but may transmit high priority packets, which may provide more resources for transmitting higher priority packets.

According to a first aspect of the disclosure, a CBR may be defined based on a percentage of radio resources busy/utilized over a measurement window. The UE may compute a CBR based on energy measurement on a resource (CBR) and a CBR based on decoding a signal on a resource ($CBR_d$). In particular, when computing the CBR&, the UE may determine that a resource is busy if energy measured on the resource is greater than a threshold (e.g., energy $S > S_{threshold}$). When computing the $CBR_d$, the UE may determine that a resource is busy if a signal on that resource is decoded. The UE may determine that the signal on the resource is decoded if a cyclic redundancy check (CRC) passes. $CBR_c$ and $CBR_d$ may be expressed as follows:

$$CBR_e = \frac{\sum 1 \vee \text{probes with resource energy (S)} > \text{Sth}}{Np}$$

$$CBR_d = \frac{\sum 1 \vee \text{probes with resource decode success (CRC pass)}}{Np}$$

According to a second aspect of the disclosure, for systems with separate control resources and data resources, the UE may compute the CBR for control resources and the CBR for data resources separately. For example, the UE may compute four types of CBRs including an energy-based CBR for control resources $CBR_{control\_e}$, a decode-based CBR for control resources $CBR_{control\_d}$, an energy-based CBR for data resources $CBR_{data\_e}$, and a decode-based CBR for data resources $CBR_{data\_d}$ as follows:

$$CBR_{control\_e} = \frac{\sum 1 \vee \text{probes with control resource energy}}{Np}$$

$$CBR_{control\_d} = \frac{\sum 1 \vee \text{probes with control resource decode success}}{Np}$$

$$CBR_{data\_e} = \frac{\sum 1 \vee \text{probes with data resource energy}}{Np}$$

$$CBR_{data\_d} = \frac{\sum 1 \vee \text{probes with data resource decode success}}{Np}$$

According to a third aspect of the disclosure, the upper limit for the CBR (e.g., $CBR_{control\_e}$, $CBR_{control\_d}$, $CBR_{data\_e}$, $CBR_{data\_d}$) may be configured for the UE. In an aspect, the upper limit for each type of CBR (e.g., $CBR_{limit}$) may be provided via pre-configuration and/or a dynamic configuration. In an aspect, the pre-configuration may be performed via at least one of the UE or a universal integrated circuit card (UICC). In an aspect, the dynamic configuration is performed based on at least one of RRC signaling from a base station, signaling from an intelligent transportation system (ITS) sever, or signaling from an operator-controlled server. For example, a base station may provide the upper limit via an RRC message to the UE or the upper limit may be preconfigured within the UE.

According to a fourth aspect of the disclosure, the CR upper limit ($CR_{limit}$) on the channel utilization defined by the CR (e.g., in terms of percentage of radio resources) may be computed as follows:

$$CR_{limit} = \frac{CBR_{limit}}{f^{-1}(CBR)}$$

where $f^{-1}$ (CBR)=$N_{Sta}$ such that the inverse function $f^{-1}$ may determine a number of stations (e.g., UEs, transmitters) based on the CBR.

The inverse function $f^{-1}$ may be configured, e.g. via a pre-configuration within the UE or a dynamic configuration. In an aspect, the pre-configuration may be performed via at least one of the UE or a UTCC. In an aspect, the dynamic configuration is performed based on at least one of RRC signaling from a base station, signaling from an ITS sever, or signaling from an operator-controlled server. In an aspect, the function f may be a fixed function (e.g., linear or exponential) or may be dynamically configured in the UE. Based on the CBR limit, the UE may compute the $CR_{limit}$ in terms of the percentage of radio resources that the UE is allowed to occupy, where the $CR_{limit}$ may represent the maximum allowed channel utilization.

The $CR_{limit}$ may be determined based on the energy-based CBR or the decode-based CBR, based on whether the UE detects another technology different from the technology of the UE. In particular, the UE may determine the $CR_{limit}$ based on the decode-based CBR if the UE determines another technology is detected. The UE may determine the $CR_{limit}$ based on the energy-based CBR if the UE determines another technology is not detected. Thus, for example, the CR limit may be determined as follows:

$$\text{If } \frac{\left(\sum_{iP=o}^{MW/Tp} 1_{(Ed>f\cdot Ec)} 1_{(Ec>Th)}\right)}{\sum_{iP=o}^{MW/Tp} 1_{(Ec>Th)}} < Th_2 \text{ (e.g. } 0.75\text{),}$$

$$\text{Then: } CR_{limit} = \frac{CBR_{limit\_d}}{f^{-1}(CBR_d)},$$

$$\text{Else: } CR_{limit} = \frac{CBR_{limit\_e}}{f^{-1}(CBR_e)}.$$

In the above example, the UE may detect another technology by considering energy instances where energy (Ec) on the resources is greater than a threshold (Th) and decode instances where a signal can be decoded (Ed) for the resources with energy (Ec) greater than a threshold (Th). If the ratio of the decode instances to the energy instances falls below a technology threshold ($Th_2$), then the UE determines that another technology is present and may use the $CBR_{limit\_d}$ for coexistence among multiple technologies to compute $CR_{limit}$. If the ratio of the decode instances to the energy instances does not fall below the technology threshold ($Th_2$), then the UE may determine that another technology is not present and thus uses the $CBR_{limit\_e}$ compute the $CR_{limit}$. In an aspect, the UE may ensure that $CBR_{limit\_d}$ is less than or equal to $CBR_{limit\_e}$. $f^{-1}$ ($CBR_d$) may be a number of stations (e.g., UEs, transmitters) utilizing the same technology as the UE computing the $CR_{limit}$ because the UE may not be able to decode signals of a different technology. On the other hand, $f^{-1}$ ($CBR_e$) may be a number of stations (e.g., UEs, transmitters) utilizing any technology because the UE considers energy on the resource which may include energy caused by the UE's technology as well as energy caused by other technologies.

If no co-channel coexistence among different technologies is expected, then $CBR_{limit\_d}$ may not be configured and CR limits may be given by $CBR_{limit\_e}$.

According to a fifth aspect of the disclosure, the UE may adjust transmission parameters (e.g., a number of occupied resource, MCS, a transmission rate, a number of HARQ retransmissions, transmission power etc.) to maintain the CR value to be below the $CR_{limit}$. For example, if the $CR_{limit}$ indicates 10% of total resources and the current CR is greater than 10% h, then the UE may increase the MCS to increase the coding rate such that fewer resources may be used to transmit the same amount of data, to decrease the CR to 10%. In another example, if the UE performs multiple transmissions, the UE may adjust the number of transmissions to adjust the CR, where decreasing the number of transmissions may decrease the CR. In another example, the UE may decrease the CR by increasing the periodicity of transmission to decrease a transmission rate (e.g., to address congestion) and/or by decreasing the number of HARQ retransmissions. The transmission rate is a rate at which the UE performs transmission. For example, the UE may decrease the transmission rate to transmit every 200 msec instead of every 100 msec, to reduce congestion. In an aspect, the UE may perform the fifth aspect of the disclosure after performing the fourth aspect of the disclosure.

According to a sixth aspect of the disclosure, the $CBR_{limit}$ may vary depending on a packet priority of a packet. In an aspect, the UE may compute the $CR_{limit}$ according to a priority of a packet being transmitted. In an aspect, a higher $CBR_{limit}$ may be used for a higher priority packet. For example, if a system supports packets of three priorities (p=0,1,2), with p=0 being the highest priority, the UE may determine different $CBR_{limit}$ values for each of the different priorities. In particular, the UE may determine $CBR_{limit\_p0}$ for p=0, $CBR_{limit\_p1}$ for p=1, $CBR_{limit\_p2}$ for p=2, where $CBR_{limit\_p2} < CBR_{limit\_p1} < CBR_{limit\_p0}$ (e.g., $CBR_{limit\_p2}=0\%$, $CBR_{limit\_p1}=50\%$, $CBR_{limit\_p0}=80\%$. In the example, if the CBR increases to over 30%, the UE may refrain from transmitting packets with priority 2 (p=2). In an aspect, for example, the sixth aspect of the disclosure may ensure that lower priority traffic may congest the system up to a low threshold (e.g. 30%) while still allowing higher priority traffic to be successfully transmitted by allowing the higher priority traffic to congest the resources up to a high threshold (e.g., 80%).

According to a seventh aspect of the disclosure, if the LE is transmitting packets with different priorities, then the priority information of the packets may be considered as follows. When the UE has packets with different priorities for transmission, the UE may determine a $CBR_{limit}$ per priority and a $CR_{limit}$ per priority. Thus, the $CBR_{limit}$ and the $CR_{limit}$ vary based on the priority. If a CBR is below a $CBR_{limit}$ for a particular priority, then the UE may transmit packets with the particular priority. For example, if a CBR is below a $CBR_{limit\_p1}$, the UE may transmit packets with the priority p1. However, if the CBR is greater than a $CBR_{limit}$ for a low priority and less than a $CBR_{limit}$ for a high priority, the UE may transmit the packets with the high priority and may not transmit packets with the low priority. For example, in case where $CBR_{limit\_p2} < CBR_{limit\_p1} < CBR_{limit\_p0}$, if the CBR is below $CBR_{limit\_p2}$, the UE may transmit packets with the priority p2 as well as packets with the priority p1 and the packets with priority p0. On the other hand, if the CBR is greater than $CBR_{limit\_p1}$ and less $CBR_{limit\_p0}$, the UE may transmit packets with priority p0 but may not transmit packets with priority p1 or priority p2.

If the packets with different priorities may be transmitted, the UE may transmit the packets according to at least one of the following options. According to a first option, the UE may first transmit all higher priority packets before transmitting lower priority packets. In an aspect, before transmission, packets may be placed in different transmit queues based on different priorities. Thus, the UE may empty a queue of higher priority packets to prepare the higher priority packets for transmission before accessing a queue of lower priority packets.

According to a second option, the UE may assign different weights for different priorities, and may transmit packets of different priorities based on the weights. The weight per priority w_p may define a portion of packets with priority p to be transmitted. For example, if the packets have two priorities p1 and p2, weights of w_1=0.75 and w_2=0.25, respectively, three p1 packets for every one p2 packet may be transmitted. Based on a CBR limit per priority, if the set of priorities that the UEs may transmit is P={0, 1, ..., p−1}, the weights for the priorities may be normalized such that a sum of the normalized weights is equal to 1 within the set P, based on:

$$\overline{w_l} = \frac{w_l}{\sum_{k \in P} w_k},$$

where $\overline{w_l}$ is a normalized weight for a priority. In an example where four priorities of packets are possible and w_0=0.6, w_1=0.2, w_2=0.15, w_3=0.05, when packets with priority p0 and priority p1 may be transmitted (e.g., P={0, 1}), w_0 and w_1 may be normalized such that a sum of the normalized weights is equal to 1. Thus, in this example, the normalized w_0=0.75 and the normalized w_1=0.25, such that the sum of the normalized w_0 and the normalized w_1 is 1.

Systems and methods described herein are directed to enhanced congestion control enhancements for D2D communications, including for aperiodic communications. The enhanced functionality may enable enhanced or improved operation in NR V2X modes. In some implementations, the systems and methods described herein enable congestion control based on a CR window that is more limited in time compared to LITE. For example, the CR window may limit the future usage estimation to currently scheduled or granted aperiodic transmission. Accordingly, such systems and methods can better support aperiodic transmissions and may be utilized for URLLC modes.

Figure 5:
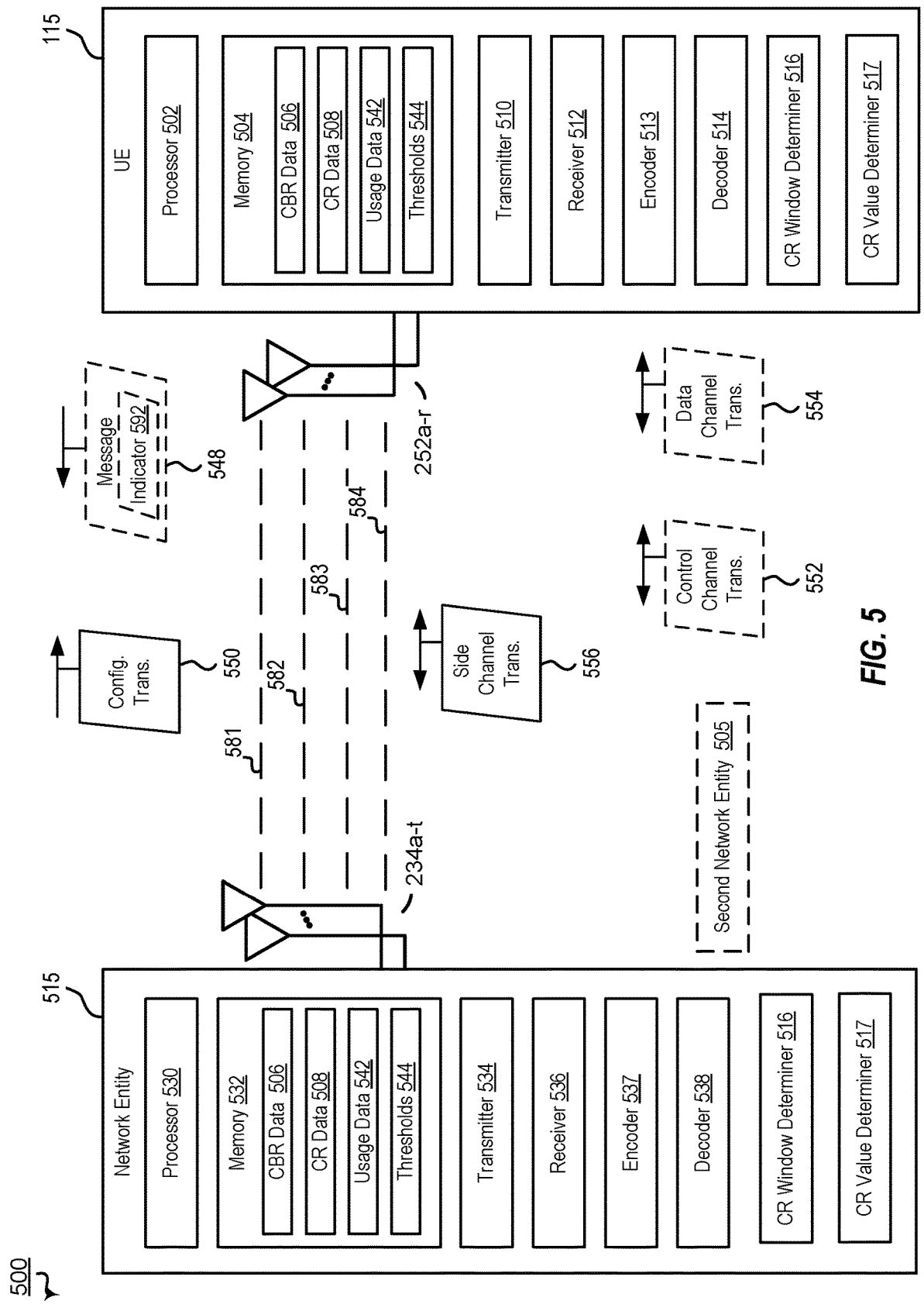
FIG. 5 is a block diagram illustrating an example of a wireless communications system that enables enhanced congestion control for device-to-device communications in accordance with aspects of the present disclosure.

FIG. 5 illustrates an example of a wireless communications system 500 that supports D2D congestion control in accordance with aspects of the present disclosure. In some examples, wireless communications system 500 may implement aspects of wireless communication system 100. For example, wireless communications system 500 may include UE 15, network entity 515 (e.g., a second UE), and optionally second network entity 505 (e.g., base station 105). Enhanced congestion control operations may enable more aperiodic communications to be transmitted, and thus may increase throughput and reduce latency. Such increased throughput and reduced latency may enable URLLC and may be utilized to increase reliability, and possibly throughput when congestion is present between devices.

Network entity 515 and UE 115 may be configured to communicate via frequency bands, such as FR1 having a frequency of 410 to 7125 MHz or FR2 having a frequency of 24250 to 52600 MHz for mm-Wave. It is noted that sub-carrier spacing (SCS) may be equal to 15, 30, 60, or 120 kHz for some data channels. Network entity 515 and UE 115 may be configured to communicate via one or more component carriers (CCs), such as representative first CC 581, second CC 582, third CC 583, and fourth CC 584. Although four CCs are shown, this is for illustration only, more or fewer than four CCs may be used. One or more CCs may be used to communicate control channel transmissions, data channel transmissions, and/or sidelink channel transmissions.

For example, sidelink channel transmission 556 may be transmitted between UE 115 and network entity 515. Optionally data and control channel transmissions 552 and 554 may be transmitted between UE 115 and second network entity 505. Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a PSCCH, a PSSCH, or a PSFCH. Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 515 and UE 115. For example, the control information may be communicated suing MAC-CE transmissions, RRC transmissions, DCI, transmissions, another transmission, or a combination thereof.

UE 115 includes processor 502, memory 504, transmitter 510, receiver 512, encoder, 513, decoder 514, CR window determiner 516, CR value determiner 517 and antennas 252a-r. Processor 502 may be configured to execute instructions stored at memory 504 to perform the operations described herein. In some implementations, processor 502 includes or corresponds to controller/processor 280, and memory 504 includes or corresponds to memory 282. Memory 504 may also be configured to store CBR data 506, CR data 508, usage data 542, thresholds 544, or a combination thereof, as further described herein.

The CBR data 506 includes or corresponds to data for a channel busy ratio for one or more resources, such as a resource pool. The resource pool may include sidelink channel, such as one or more of PSCCH, PSSCH, or PSFCH. The CBR data 506 may include data indicating a CBR window, such as which subframes are in a given CBR window, indicating a CBR measurement value, or both. In some implementation's, the CBR measurement value is an emergency based CBR value, such as determined based on energy (e.g., RSSI). To illustrate, if RSSI is above a threshold a resource is determined to be busy or used. The CBR may correspond to a ratio of busy resources to total resources.

The CR data 508 includes or corresponds to data for a channel occupancy ratio for the one or more resources. The CR data 508 may include data indicating a CR window, such as which subframes are in a given CR window, indicating a CR measurement value, or both. The CR window may be determined based on the usage data 542. The usage data 542 indicates a usage history and an estimated future usage. In a particular implementation, the CR window is determined based on an estimated future usage that is limited to a current aperiodic transmission and retransmissions thereof. The CR measurement value may be determined based on the CBR measurement value. For example, the CR measurement value may be determined and the adjusted or evaluated based on the CBR value and one or more thresholds, indicated by the threshold 554.

Additionally, the CBR data 506 and the CR data 508 may include settings data, such as window size or duration settings, window parameters, measurement parameters, etc. Such settings may be pre-set and/or RRC configurable. Additionally, other related setting may be stored at memory 504, such as a number of allowed retransmissions and/or a timing of the retransmissions.

Transmitter 510 is configured to transmit data to one or more other devices, and receiver 512 is configured to receive data from one or more other devices. For example, transmitter 510 may transmit data, and receiver 512 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 510 and receiver 512 may be replaced with a transceiver. Additionally, or alternatively, transmitter 510, receiver, 512, or both may include or correspond to one or more components of UE 115 described with reference to FIG. 2.

Encoder 513 and decoder 514 may be configured to encode and decode data for transmission. CR window determiner 516 may be configured to determine a window size and/or location of the CR window. For example, CR window determiner 516 is configured to determine a size and a location of subframes for the CR window. CR value determiner 517 may be configured to determine and/or evaluate a CR value for one or more subframes of the CR window. For example, CR value determiner 517 is configured to determine a CR value for a subframe of the window and compare it to a corresponding CBR value to determine if the CR value and/or one or more transmission parameters should be adjusted.

Network entity 515 includes processor 530, memory 532, transmitter 534, receiver 536, encoder 535, decoder 538, and antennas 234a-t. Processor 530 may be configured to execute instructions stores at memory 532 to perform the operations described herein. In some implementations, processor 530 includes or corresponds to controller/processor 240, and memory 532 includes or corresponds to memory 242. Memory 532 may be configured to store CBR data 506, CR data 508, usage data 542, thresholds 544, or a combination thereof, similar to the UE 115 and as further described herein.

Transmitter 534 is configured to transmit data to one or more other devices, and receiver 536 is configured to receive data from one or more other devices. For example, transmitter 534 may transmit data, and receiver 536 may receive data, via a network, such as a wired network, a wireless network, or a combination thereof. For example, network entity 515 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 534 and receiver 536 may be replaced with a transceiver. Additionally, or alternatively, transmitter 534, receiver, 536, or both may include or correspond to one or more components of network entity 515 described with reference to FIG. 2. Encoder 535, and decoder 538 may include the same functionality as described with reference to encoder 513 and decoder 514, respectively.

During operation of wireless communications system 500, network entity 515 and/or second network entity 505 may determine that UE 115 has enhanced congestion control capability. For example, UE 115 may transmit a message 548 that includes an enhanced congestion control indicator 592. Indicator 592 may indicate enhanced congestion control capability or a particular type of enhanced congestion control, such as enhanced congestion control for NR V2X. In some implementations, second network entity 505 sends control information to indicate to UE 115 that enhanced congestion control is to be used. For example, in some implementations, message 548 (or another message, such as configuration transmission 550) is transmitted by the second network entity 505. The configuration transmission 550 may include or indicate to use enhanced congestion control or to adjust or implement a setting of enhanced congestion control, such as a window size or a threshold.

During operation, devices of wireless communications system 500, transmit control, data, and/or sidelink channel transmissions to other devices of wireless communications system 500. For example, UE 115 and a base station (e.g., 505) may transmit control and data information on control and data channels. Multiple end devices or UEs may transmit control and data information on one or more sidelink channels directly to each other and independent of a base station of wireless communications system 500. One or more of the end devices or UEs may perform congestion control operations. For example, UE 115 may track usage for one or more sidelink channel resources, such as PSCCH and PSSCH or PSCCH, PSSCH, and PSFCH. Additionally, UE 115 may estimate usage for the one or more sidelink channel resources for future transmissions. The future transmissions may include future retransmission of a current transmission and optionally future transmissions and any retransmissions. In a particular implementation, the future transmissions are limited to a last transmission of a current or active transmission, such as a currently scheduled transmission. In such implementations, the UE 115 may not consider or refrain from considering future periodic transmissions.

Additionally, when a set or configurable window size is used, limiting the future transmissions may place more emphasis on previous transmissions and/or may extend the history to include a longer history of transmissions.

Based on the history of usage tracked and the estimated usage, the UE 115 may determine a CBR measurement value. The CBR measurement value may be associated with a particular CBR window. A size of the CBR window may be preset or configured by the devices of the wireless communications system 500.

In addition, the UE 115 determines a CR window and a CR value. CR may be evaluated at a particular subframe, such as subframe n. A CR value may be determined based on a total number of sub-channels used for previous transmissions and sub-channels granted for future subframes divided by the total number of configured sub-channels over the window considered. For example, the window may be defined by how many transmissions and of what type, previous or future are to be considered for CR calculation.

As an example, the CR window determiner 516 determines a window for a particular subframe, such as a location of a starting subframe and an ending subframe based on a window size. To illustrate, the CR window determiner 516 determines the location of the window based on an equation. As an illustrative, non-limiting example, a window location is determined based on the equation a+b+1=C, where a is a positive integer, b is 0 or a positive integer, and C is a size or duration of the CR window. In some implementations, C may be a number, such as 1000 ms. In other implementations, C may be determined based on a formula, such as X times a size or duration of the CBR window. To illustrate, C may equal 10 time a size of the CBR window. In a particular implementation, n+b should not exceed the last planned retransmission of the current transmission. Thus, the CR window starting location and ending location may be frame n−a and frame n+b, for a window of [n−a, n+b]. Accordingly, CR may be determined based on a total number of subchannels used for its transmissions in subframes [n−a, n−1] and granted in subframes [n, n+b] divided by the total number of configured sub-channels in the transmission pool over [n−a, n+b].

CR value determiner 517 determines a CR value for the particular subframe (n) and window based on subchannel usage, such as described above, and based on the CBR value. For example, the CR value determiner 517 may determine a CR value based on sub-channel usage as described above. The determined CR value may be adjusted based on a corresponding CBR value. For example, the determined CR value may be compared with a particular CBR threshold or thresholds, which are determined based on the CBR value. In a particular implementation, the CR value is adjusted, such as by table or formula, based on the comparison. A corresponding CBR value may include or correspond to a CBR value for a similar window or for the same subframe as the CR value.

The UE 115 may perform congestion control based on the CR value. For example, the UE 115 may adjust its subchannel usage based on the CR value. To illustrate, the UE 115 may adjusted its subchannel usage for PSCCH and PSSCH or for PSCCH, PSSCH, and PSFCH with network entity 515. As another example, the UE 115 may adjust transmission settings based on the CR value.

Thus, FIG. 5 describes enhanced congestion control operations for D2D communications. Using enhanced congestion control may enable improvement when operating in D2D modes. Performing enhanced congestion control operations enables a network to reduce latency and improve reliability. Improving performance may improve throughput for communications on the network and enable use of mm wave frequency ranges and URLLC modes.

Figure 8:
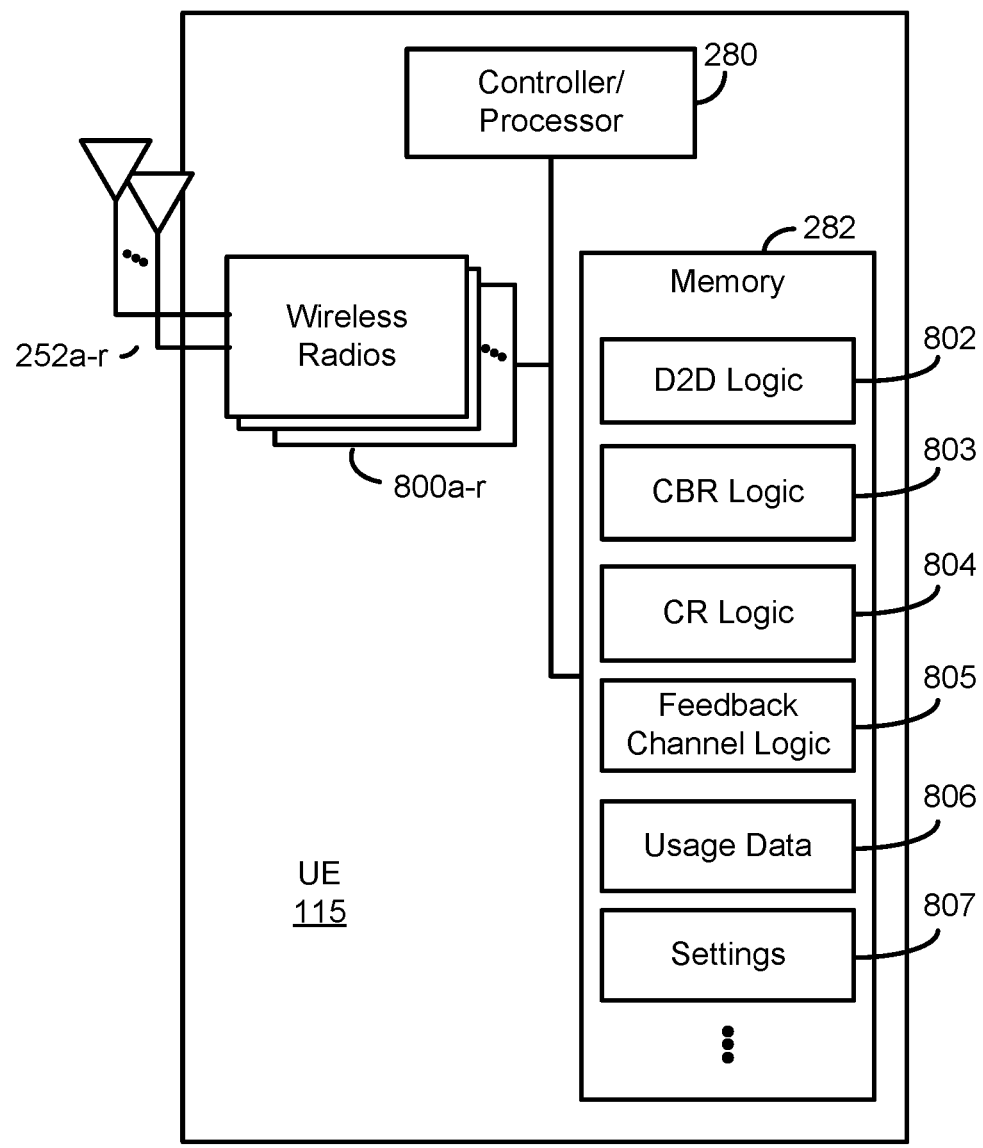
FIG. 8 is a block diagram conceptually illustrating a design of a UE according to some embodiments of the present disclosure.

FIG. 6 is a block diagram illustrating example blocks executed by a UE configured according to an aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 8, memory 282 stores D2D logic 802 (e.g., NR V2X Logic), CBR logic 803, CR logic 804, Feedback Channel logic 805, usage data 806, and settings data 807.

At block 600, a mobile communication device, such as a UE, a channel busy ratio (CBR) window for a CBR measurement for one or more resources. A UE, such as UE 115, receives and sends transmissions via wireless radios 800*a-r* and antennas 252*a-r* and records a usage of the transmissions and any future/scheduled transmissions. The one or more resources may include or correspond to a pool of resources, such as a resource pool. The one or more resources may include sidelink channel resources, such as PSCCH, PSSCH, PSFCH, etc.

The UE 115 may execute, under control of controller/processor 280, D2D logic 802, stored in memory 282. The execution environment of D2D logic 802 provides the functionality for UE 115 to define and perform the congestion control procedures. Additionally, the UE 115 may execute one or more of CBR logic 803 and/or CR logic 804. The execution environment of D2D logic 802 (and optionally CBR logic 803 and/or CR logic 804) defines the different congestion control processes, such as determining a CBR window, a CBR value, a CR window, a CR value, or a combination thereof. To illustrate, UE 115 may determine the CBR window based on a set size or duration for sidelink channel resources.

At block 601, the UE 115 determines a CBR measurement value for the CBR window and for the one or more resources. The CBR measurement value may be an energy based CBR value, such as based on RSSI. For example, resources may be determined as occupied or busy based on an energy value exceeding a threshold energy value. The UE 115 determines a CBR value for and based on the sidelink channel resources, such as under the execution logic of the D2D logic 802 and/or CBR logic 803.

At block 602, the UE 115 determines a channel occupancy ratio (CR) window based on a first number of subframes used for a history of past transmissions and based on a second number of subframes used for future planned transmissions and corresponding retransmissions. For example, the UE 115 determines an amount of subframes to use for usage history and an amount of subframes to use for future transmissions. To illustrate, the UE 115 may determine to use X number of subframes for future transmission where X corresponds to a subframe of a last retransmission of a current transmission. Then, UE 115 may determine to use Y number of subframes based on the number X and a size of the CR window.

At block 603, the UE 115 determines a CR value for the CR window based on subchannels used for the one or more resources for the first number of subframes and based on subchannels estimated for the one or more resources for the second number of subframes. Additionally, the UE 115 may determine the CR value based on the CBR value. For example, the UE 115 determines a CR value based on subchannels used and subchannels available, and the UE 115 may adjust the CR value based on the CBR value. The UE 115 may perform congestion control operations as described herein based on the CR value, and optionally the CBR. For example, the UE may adjust channel usage based on CBR threshold(s) determined based on the CBR value. To illustrate, one or more CBR thresholds are set which have corresponding CR limits. Whenever a measured CBR reaches to a threshold or satisfies a condition, the UE checks if its CR value is within the corresponding CR limit or not. If not, the CR value is adjusted and congestion control may be performed.

The UE 115 may execute additional blocks (or the UE 115 may be configured further perform additional operations) in other implementations. For example, the UE 115 may perform one or more operations described above. As another example, the UE 115 may perform one or more aspects as described below.

In a first aspect, a last transmission of the future planned transmissions is a last retransmission of a currently scheduled transmission.

In a second aspect, alone or in combination with the first aspect, determining the CR window includes refraining from considering future periodic transmissions scheduled by a previously received periodic grant.

In a third aspect, alone or in combination with one or more of the above aspects, the CR value corresponds to a particular subframe of the CR window, and where determining the CR value includes: evaluating, by the UE, the particular subframe of the CR window based on a first number of subchannels used for the first number of subframes used for the history of the past transmissions of the CR window, based on a second number of subchannels used for the second number of subframes used for the future planned transmissions and corresponding retransmissions of the CR window to determine the CR value, and based on a total number of configured subchannels available for the one or more resources in the CR window.

In a fourth aspect, alone or in combination with one or more of the above aspects, the future planned transmissions and corresponding retransmissions include retransmissions of a currently scheduled transmission, where the retransmissions occur within a packet delay budget for each packet from generation.

In a fifth aspect, alone or in combination with one or more of the above aspects, a maximum number of the retransmissions is based on HARQ feedback parameters.

In a sixth aspect, alone or in combination with one or more of the above aspects, the CR window is determined based further on a duration of the CBR measurement window.

In a seventh aspect, alone or in combination with one or more of the above aspects, a duration of the CR window is ten times the CBR measurement window duration.

In an eighth aspect, alone or in combination with one or more of the above aspects, a duration of the CR window is 1000 milliseconds.

In a ninth aspect, alone or in combination with one or more of the above aspects, the UE 115 sets a duration of the CBR window, a duration of the CR window, or both, based on an RRC message.

In a tenth aspect, alone or in combination with one or more of the above aspects, the first number of subframes for the history of past transmissions is greater than or equal to half of a duration of the CR window.

In an eleventh aspect, alone or in combination with one or more of the above aspects, the first number of subframes for the history of past transmissions greater than or equal to 90 percent of a duration of the CR window.

In a twelfth aspect, alone or in combination with one or more of the above aspects, determining the CR window includes determining the CR window based on the following formula: a sum of a total number of used subchannels for subframes [n–a, n–1] and a total number of granted subchannels for subframes [n, n+b] is divided by total number of configured subchannels for subframes [n–a, n+b], where a+b+1=C, where 'a' corresponds to the first number subframes for the history of past transmissions to consider for the CR window, where 'b' corresponds to the second number of subframes for future the future planned transmissions and corresponding retransmissions to consider for the CR window, and where 'C' is a duration of the CR window.

In a thirteenth aspect, alone or in combination with one or more of the above aspects, the first number of subframes for the history of past transmissions to consider for the CR window is greater than or equal to half of the duration of the CR window.

In a fourteenth aspect, alone or in combination with one or more of the above aspects, a sum of a current frame and the second number of subframes is less than or equal to a subframe number corresponding to a last retransmission of a current transmission.

In a fifteenth aspect, alone or in combination with one or more of the above aspects, determining the CBR measurement value includes: determining a Received Signal Strength Indicator (RSSI) value; comparing the RSSI value to a threshold; determining that a resource is busy based on the RSSI value exceeding the threshold; and determining the CBR measurement value based on a number of resources being busy divided by a total number of resources in the CBR window.

In a sixteenth aspect, alone or in combination with one or more of the above aspects, the UE 115 determines the CBR measurement value independent of PSFCH resources.

In a seventeenth aspect, alone or in combination with one or more of the above aspects, the UE 115 determines a second CBR measurement value for PSFCH resources based on a second CBR window for the PSFCH resources.

In an eighteenth aspect, alone or in combination with one or more of the above aspects, the UE 115 determines the second CBR window for the PSFCH resources based on an RRC configurable parameter or a preconfigured second CBR window duration.

In a nineteenth aspect, alone or in combination with one or more of the above aspects, determining the second CBR measurement value for the PSFCH resources includes: determining a Received Signal Strength Indicator (RSSI) value for the PSFCH resources; comparing the RSSI value to a threshold; determining that a resource of the PSFCH resources is busy based on the RSSI value exceeding the threshold; and determining the second CBR measurement value based on a number of resources being busy divided by a total number of resources in the CBR window.

In a twentieth aspect, alone or in combination with one or more of the above aspects, the UE 115 determines the CBR measurement value based further on PSFCH resources.

In a twenty-first aspect, alone or in combination with one or more of the above aspects, the CBR measurement value is for PSCCH, PSSCH, or both.

In a twenty-second aspect, alone or in combination with one or more of the above aspects, the CBR measurement value is for PSCCH, PSSCH, and PSFCH.

In a twenty-third aspect, alone or in combination with one or more of the above aspects, determining the CR value for the CR window based on the CBR measurement value includes: selecting the CR value from a table based on the CBR measurement value; or calculating the CR value based on the CBR measurement value and a CR calculation formula.

In a twenty-fourth aspect, alone or in combination with one or more of the above aspects, the UE is operating in a PSCCH/PSSCH multiplexing mode, and a single CBR measurement is made for both PSCCH and PSSCH.

In a twenty-fifth aspect, alone or in combination with one or more of the above aspects, the UE 115 performs congestion control based on the CR value, where performing the congestion control includes one or more of adjusting an amount of subchannels to use for the one or more resources, adjusting an amount of retransmissions, adjusting a modulation coding scheme (MCS), or adjusting a communication channel frequency.

In a twenty-sixth aspect, alone or in combination with one or more of the above aspects, the UE is an autonomous vehicle configured for fifth generation wireless new radio (5G NR) vehicle-to-everything (V2X) communications.

Accordingly, a UE and a base station may perform enhanced congestion control for D2D modes. By performing enhanced congestion control for D2D modes, latency and overhead may be reduced and throughput and reliability may be increased.

FIG. 7 is a block diagram illustrating example blocks executed by a UE configured according to an aspect of the present disclosure. The example blocks will also be described with respect to UE 115 as illustrated in FIG. 8. At block 700, a mobile communication device, such as a UE, determines a channel busy ratio (CBR) window for a CBR measurement for one or more resources. For example, UE 115 determines the CBR window similar to block 600.

At block 701, the UE 115 determines a CBR measurement value for the CBR window and for the one or more resources. The UE 115 determines the CBR value similar to block 601.

At block 702, the UE 115 determines a channel occupancy ratio (CR) window based on the CBR measurement value. For example, the UE 115 determines a size of the CR window based on a size of the CBR window. The size of the windows may include or correspond to a duration of the windows.

The UE 115 may execute additional blocks (or the UE 115 may be configured further perform additional operations) in other implementations. For example, the UE 115 may perform one or more operations described above. As another example, the UE 115 may perform one or more aspects as described with reference to FIG. 6.

Accordingly, a UE and a base station may perform enhanced congestion control for D2D modes. By performing enhanced congestion control for D2D modes, additional functionality can be achieved, such as a dynamic or flexible window size (e.g., duration) can be utilized for congestion control. Consequently, latency and overhead may be reduced and throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication at a user equipment (UE), the method comprising:
   determining a channel busy ratio (CBR) window for a CBR measurement for one or more resources;
   determining a CBR measurement value for the CBR window and for the one or more resources;
   determining a channel occupancy ratio (CR) window based on a first number of subframes used for a history of past transmissions and based on a second number of subframes used for future planned transmissions and corresponding retransmissions, wherein a duration of the CR window does not exceed a subframe of a last planned retransmission of the future planned transmissions and corresponding retransmissions;
   determining a CR value for the CR window based on subchannels used for the one or more resources for the first number of subframes and based on subchannels estimated for the one or more resources for the second number of subframes; and
   performing a congestion control operation based on the CR value.

2. The method of claim 1, wherein a last transmission of the future planned transmissions and corresponding retransmissions is a last retransmission of a currently scheduled transmission.

3. The method of claim 1, wherein determining the CR window includes refraining from including future periodic transmissions scheduled by a previously received periodic grant in the second number of subframes.

4. The method of claim 1, wherein the CR value corresponds to a particular subframe of the CR window, and wherein determining the CR value includes:
   evaluating the particular subframe of the CR window based on a first number of subchannels used for the first number of subframes used for the history of the past transmissions of the CR window, based on a second number of subchannels used for the second number of subframes used for the future planned transmissions and corresponding retransmissions of the CR window to determine the CR value, and based on a total number of configured subchannels available for the one or more resources in the CR window.

5. The method of claim 1, wherein the future planned transmissions and corresponding retransmissions include retransmissions of a currently scheduled transmission, wherein the retransmissions occur within a packet delay budget for each packet from generation of the currently scheduled transmission.

6. The method of claim 1, wherein a maximum number of the retransmissions is based on HARQ feedback parameters.

7. The method of claim 1, wherein the CR window is determined based further on a duration of the CBR window.

8. The method of claim 7, wherein h duration of the CR window is ten times the duration of the CBR window.

9. The method of claim 1, wherein the CBR measurement value is for a physical sidelink control channel (PSCCH), a physical sidelink shared channel (PSSCH), and a physical sidelink feedback channel (PSFCH).

10. The method of claim 1, wherein determining the CR value for the CR window based on the CBR measurement value includes:
    selecting the CR value from a table based on the CBR measurement value; or
    calculating the CR value based on the CBR measurement value and a CR calculation formula.

11. The method of claim 1, wherein the UE is operating in a physical sidelink control channel (PSCCH)/physical sidelink shared channel (PSSCH) multiplexing mode, and wherein a single CBR measurement is made for both the PSCCH and the PSSCH.

12. The method of claim 1, wherein performing the congestion control operation based on the CR value includes performing one or more operations including adjusting an amount of subchannels to use for the one or more resources, adjusting an amount of retransmissions, adjusting a modulation coding scheme (MCS), adjusting a communication channel frequency, refraining from transmitting a communication during the CBR window, or a combination thereof.

13. The method of claim 1, wherein the future planned transmissions and corresponding retransmissions comprise a currently planned transmission and corresponding retransmissions of the currently planned transmission, and further comprising:
    receiving a scheduling message for the future planned transmissions and corresponding retransmissions prior to determining the CR window and the CR value,
    determining the future planned transmissions and corresponding retransmissions based on the scheduling message prior to determining the CR window and the CR value.

14. The method of claim 1, wherein the first number of subframes for the history of past transmissions is greater than half of the duration of the CR window, and wherein a sum of a subframe number for a current subframe and the second number of subframes is less than or equal to a subframe number corresponding to the last planned retransmission.

15. An apparatus configured for wireless communication at a user equipment (UE), the apparatus comprising:
one or more processors; and
a memory coupled to the one or more processors, with instructions stored in the memory and executable by the one or more processors to cause the apparatus to:
determine a channel busy ratio (CBR) window for a CBR measurement for one or more resources;
determine a CBR measurement value for the CBR window and for the one or more resources;
determine a channel occupancy ratio (CR) window based on a first number of subframes used for a history of past transmissions and based on a second number of subframes used for future planned transmissions and corresponding retransmissions, wherein a duration of the CR window does not exceed a subframe of a last planned retransmission of the future planned transmissions and corresponding retransmissions;
determine a CR value for the CR window based on subchannels used for the one or more resources for the first number of subframes and based on subchannels estimated for the one or more resources for the second number of subframes; and
perform a congestion control operation based on the CR value.

16. The apparatus of claim 15, wherein the duration of the CR window is 1000 milliseconds, and wherein the future planned transmissions and corresponding retransmissions comprise aperiodic transmissions, periodic transmissions, or both.

17. The apparatus of claim 15, wherein the instructions are further executable by the one or more processors to cause the apparatus to:
set a duration of the CBR window, the duration of the CR window, or both, based on a radio resource control (RRC) message.

18. The apparatus of claim 15, wherein the first number of subframes for the history of past transmissions is greater than or equal to half of the duration of the CR window, and wherein the future planned transmissions and corresponding retransmissions represent actually scheduled transmissions or retransmission which take place after determining the CR window and the CR value.

19. The apparatus of claim 15, wherein the instructions to determine the CR window further include instructions executable by the one or more processors to cause the apparatus to determine the CR window based on the following formula: a sum of a total number of used subchannels for subframes [n−a, n−1] and a total number of granted subchannels for subframes [n, n+b] is divided by total number of configured subchannels for subframes [n−a, n+b], where a+b+1=C, wherein 'a' corresponds to the first number subframes for the history of past transmissions to consider for the CR window, wherein 'b' corresponds to the second number of subframes for the future planned transmissions and corresponding retransmissions to consider for the CR window, and wherein 'C' is h duration of the CR window.

20. The apparatus of claim 19, wherein the first number of subframes for the history of past transmissions to consider for the CR window is greater than or equal to half of the duration of the CR window, and wherein a sum of a current frame and the second number of subframes is less than or equal to a subframe number corresponding to a last retransmission of a current transmission.

21. The apparatus of claim 15, wherein the instructions to determine the CBR measurement value further include instructions executable by the one or more processors to cause the apparatus to:
determine a Received Signal Strength Indicator (RSSI) value;
compare the RSSI value to a threshold;
determine that a resource is busy based on the RSSI value exceeding the threshold; and
determine the CBR measurement value based on a number of resources being busy divided by a total number of resources in the CBR window.

22. The apparatus of claim 15, further comprising wherein the instructions are further executable by the one or more processors to cause the apparatus to:
determine the CBR measurement value independent of physical sidelink feedback channel (PSFCH) resources.

23. The apparatus of claim 15, further comprising wherein the instructions are further executable by the one or more processors to cause the apparatus to:
determine a second CBR measurement value for physical sidelink feedback channel (PSFCH) resources based on a second CBR window for the PSFCH resources.

24. The apparatus of claim 23, further comprising wherein the instructions are further executable by the one or more processors to cause the apparatus to:
determine the second CBR window for the PSFCH resources based on an RRC configurable parameter or a preconfigured second CBR window duration.

25. The apparatus of claim 23, wherein the instructions to determine the second CBR measurement value for the PSFCH resources further include instructions executable by the one or more processors to cause the apparatus to:
determine a Received Signal Strength Indicator (RSSI) value for the PSFCH resources;
compare the RSSI value to a threshold;
determine that a resource of the PSFCH resources is busy based on the RSSI value exceeding the threshold; and
determine the second CBR measurement value based on a number of resources being busy divided by a total number of resources in the CBR window.

26. The apparatus of claim 15, wherein the instructions are further executable by the one or more processors to cause the apparatus to:
determine the CBR measurement value based further on physical sidelink feedback channel (PSFCH) resources.

27. The apparatus of claim 15, wherein the CBR measurement value is for a physical sidelink control channel (PSCCH), a physical sidelink shared channel (PSSCH), or both.

28. The apparatus of claim 15, wherein the instructions to perform the congestion control operation based on the CR value further include instructions executable by the one or more processors to cause the apparatus to perform one or more operations including adjusting an amount of subchannels to use for the one or more resources, adjusting an amount of retransmissions, adjusting a modulation coding scheme (MCS), adjusting a communication channel frequency, refraining from transmitting a communication during the CBR window, or a combination thereof.

29. An apparatus configured for wireless communication at a user equipment (UE), the apparatus comprising:
means for determining a channel busy ratio (CBR) window for a CBR measurement for one or more resources;
means for determining a CBR measurement value for the CBR window and for the one or more resources;

means for determining a channel occupancy ratio (CR) window based on a first number of subframes used for a history of past transmissions and based on a second number of subframes used for future planned transmissions and corresponding retransmissions, wherein a duration of the CR window does not exceed a subframe of a last planned retransmission of the future planned transmissions and corresponding retransmissions;

means for determining a CR value for the CR window based on subchannels used for the one or more resources for the first number of subframes and based on subchannels estimated for the one or more resources for the second number of subframes; and means for performing a congestion control operation based on the CR value.

30. An apparatus configured for wireless communication at a user equipment (UE), the apparatus comprising:
one or more processors; and
a memory coupled to the one or more processors, with instructions stored in the memory and executable by the one or more processors to cause the apparatus to:

determine a channel busy ratio (CBR) window for a CBR measurement for one or more resources;

determine a CBR measurement value for the CBR window and for the one or more resources;

determine a channel occupancy ratio (CR) window based on a first number of subframes used for a history of past transmissions and based on a second number of subframes used for future planned transmissions and corresponding retransmissions, wherein a duration of the CR window does not exceed a subframe of a last planned retransmission of the future planned transmissions and corresponding retransmissions;

determine a CR value for the CR window based on subchannels used for the one or more resources for the first number of subframes and based on subchannels estimated for the one or more resources for the second number of subframes; and refrain, based on the CR value, from transmitting a communication during the CBR window.

* * * * *